United States Patent
Lee et al.

(10) Patent No.: US 10,976,614 B1
(45) Date of Patent: Apr. 13, 2021

(54) STRETCHED DISPLAY PANEL AND METHOD FOR MANUFACTURING SAME

(71) Applicant: TOVIS CO., LTD., Incheon (KR)

(72) Inventors: Kyung Ha Lee, Changwon-si (KR); Kyoung Hun Yang, Incheon (KR); Young Tae Jeong, Seoul (KR); Won Gyu Lee, Incheon (KR)

(73) Assignee: TOVIS CO., LTD., Incheon (KR)

( * ) Notice: Subject to any disclaimer, the term of this patent is extended or adjusted under 35 U.S.C. 154(b) by 90 days.

(21) Appl. No.: 16/497,798

(22) PCT Filed: Mar. 26, 2018

(86) PCT No.: PCT/KR2018/003517
§ 371 (c)(1),
(2) Date: Sep. 26, 2019

(87) PCT Pub. No.: WO2018/182253
PCT Pub. Date: Oct. 4, 2018

(30) Foreign Application Priority Data

Mar. 31, 2017 (KR) .......................... 10-2017-0042245

(51) Int. Cl.
*G02F 1/1339* (2006.01)
*G09F 9/30* (2006.01)
(Continued)

(52) U.S. Cl.
CPC .......... *G02F 1/1339* (2013.01); *G02F 1/1303* (2013.01); *G02F 1/1368* (2013.01);
(Continued)

(58) Field of Classification Search
None
See application file for complete search history.

(56) References Cited

U.S. PATENT DOCUMENTS

| 5,828,435 A * | 10/1998 | Kato ...................... G02F 1/1339 349/190 |
| 2009/0109520 A1 * | 4/2009 | Park ...................... G02F 1/1679 359/296 |

(Continued)

FOREIGN PATENT DOCUMENTS

| KR | 10-1996-0024541 A | 7/1996 |
| KR | 10-0671215 B1 | 1/2007 |

(Continued)

OTHER PUBLICATIONS

International Search Report for PCT/KR2018/003517 dated Jun. 27, 2018 from Korean Intellectual Property Office.

*Primary Examiner* — Shan Liu
(74) *Attorney, Agent, or Firm* — Revolution IP, PLLC

(57) ABSTRACT

A method of manufacturing a stretched display panel includes: cutting the TFT substrate to a desired size; cutting the color filter substrate; forming an open-circuit line for open-circuiting a portion defined between a horizontal pixel line that is located at an end of the TFT substrate and another horizontal pixel line adjacent thereto in order to prevent electrical noise due to the horizontal pixel lines being introduced into the end of the TFT substrate exposed from the pixel exposure portion; and forming a reinforcement seal for covering the pixel exposure portion using a reinforcement material in order to prevent occurrence of short circuit due to introduction of foreign matter into a gap defined between the horizontal pixel line and the other horizontal pixel line and at the same time to increase rigidity of the pixel exposure portion.

5 Claims, 8 Drawing Sheets

(51) Int. Cl.
*G02F 1/1368* (2006.01)
*G02F 1/1362* (2006.01)
*G02F 1/13* (2006.01)

(52) U.S. Cl.
CPC .. *G02F 1/136204* (2013.01); *G02F 1/136222* (2021.01); *G09F 9/301* (2013.01)

(56) References Cited

U.S. PATENT DOCUMENTS

| | | | |
|---|---|---|---|
| 2010/0157412 A1* | 6/2010 | Lee | G02F 1/1679 359/296 |
| 2012/0083180 A1* | 4/2012 | Kim | G02F 1/133351 445/25 |
| 2012/0138653 A1* | 6/2012 | Kim | C03B 33/076 225/2 |
| 2012/0236514 A1* | 9/2012 | Saimen | G02F 1/13452 361/749 |
| 2012/0327319 A1* | 12/2012 | Saitoh | G02F 1/1345 349/33 |
| 2013/0265738 A1* | 10/2013 | Tannas, Jr. | H01J 9/261 361/809 |

FOREIGN PATENT DOCUMENTS

| | | |
|---|---|---|
| KR | 10-2008-0075398 A | 8/2008 |
| KR | 10-0963496 B1 | 6/2010 |
| KR | 10-2011-0099477 A | 9/2011 |
| KR | 10-2013-0142048 A | 12/2013 |

\* cited by examiner

[FIG.1]
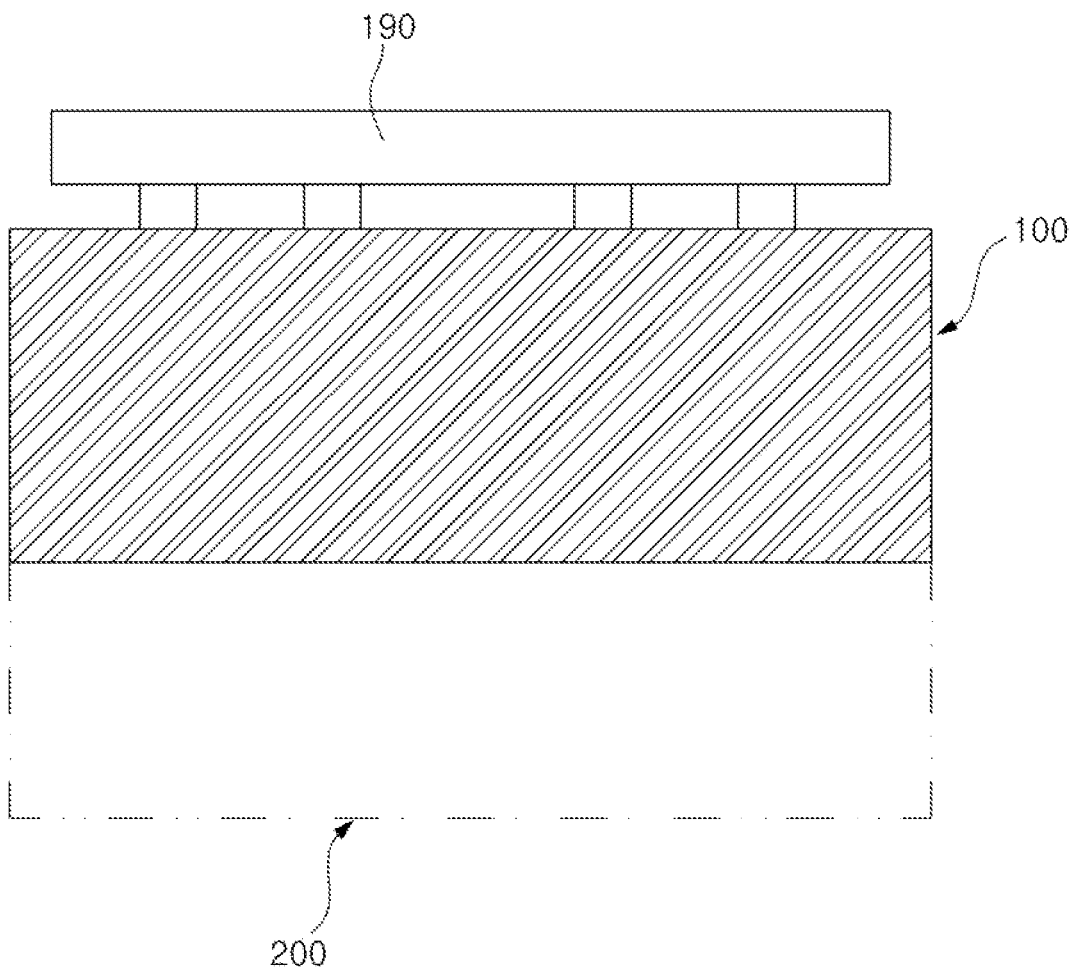

[FIG.2]
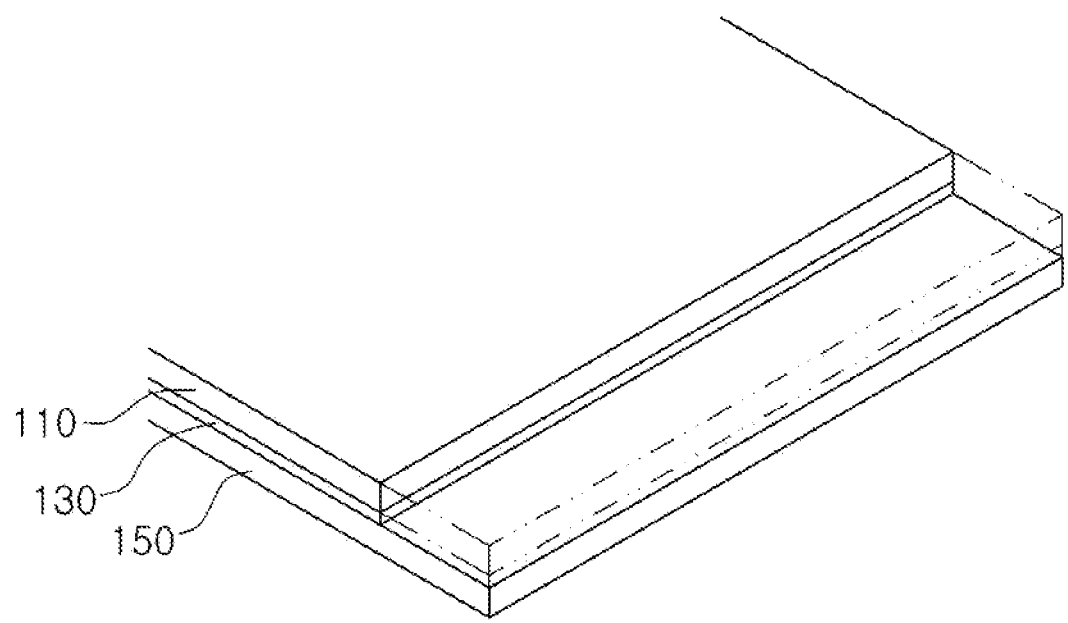

[FIG.3]
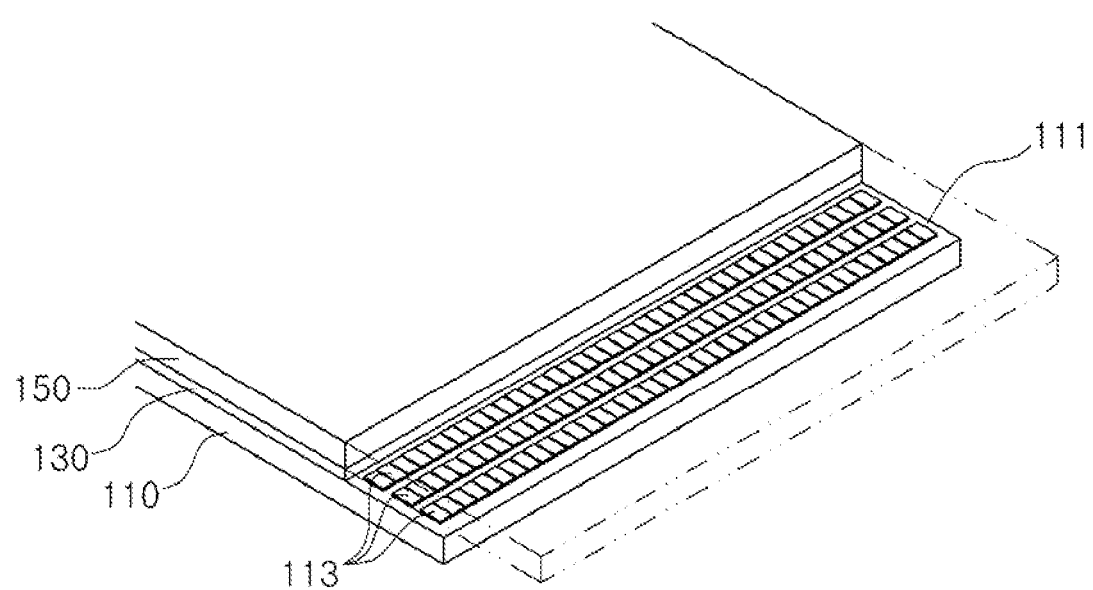

[FIG.4]
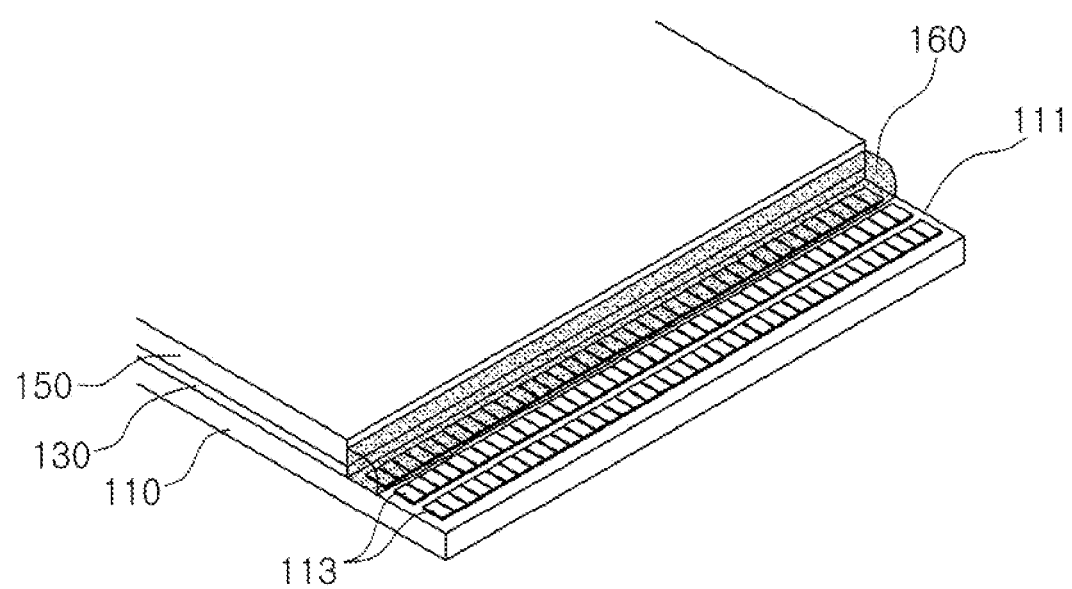

[FIG.5]
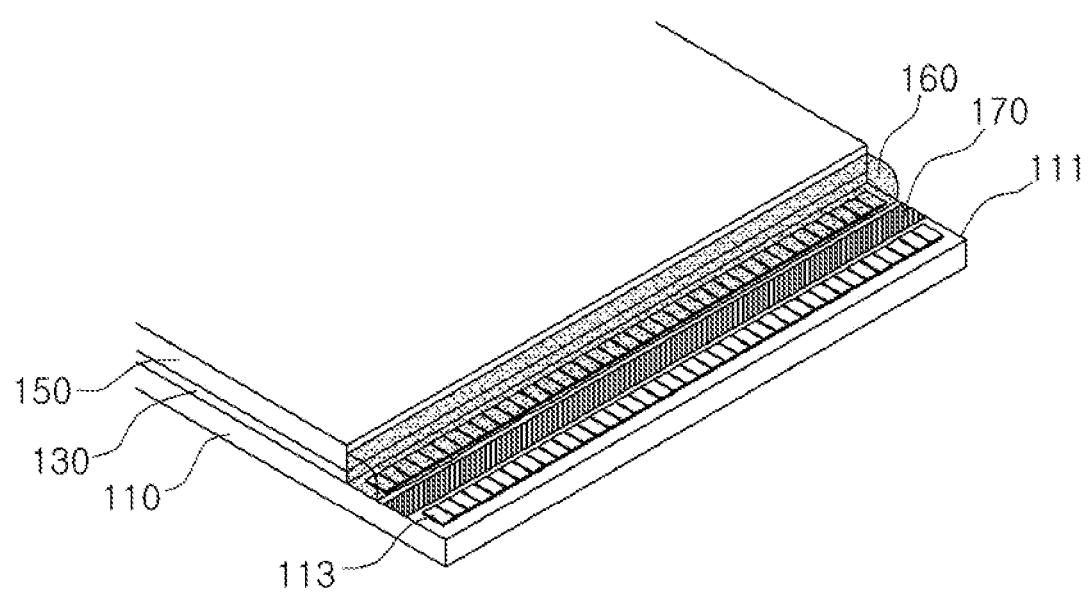

[FIG.6]
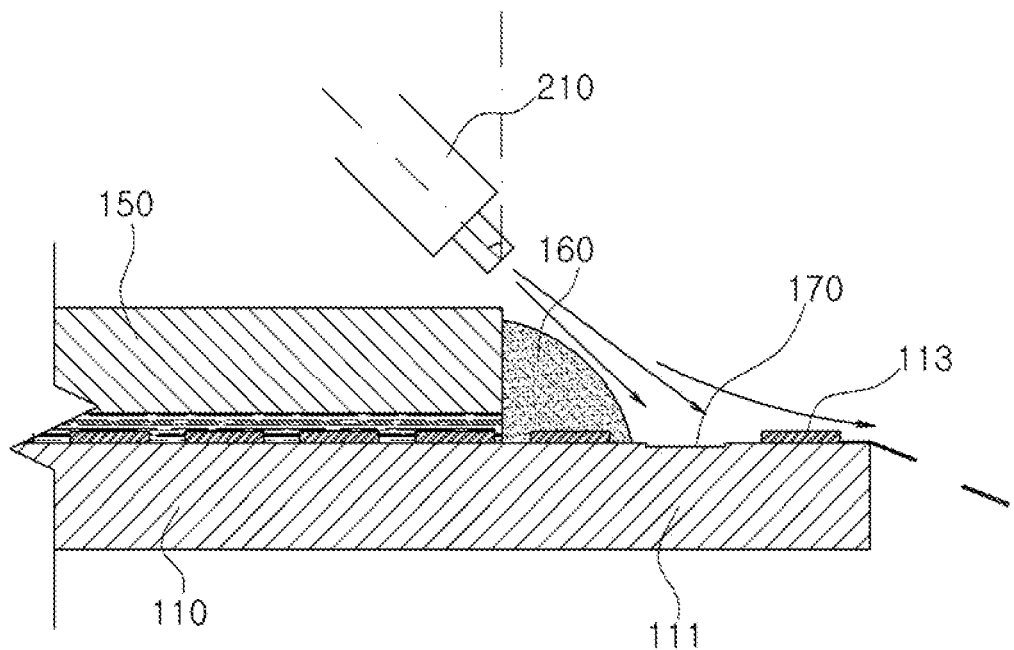

[FIG.7]
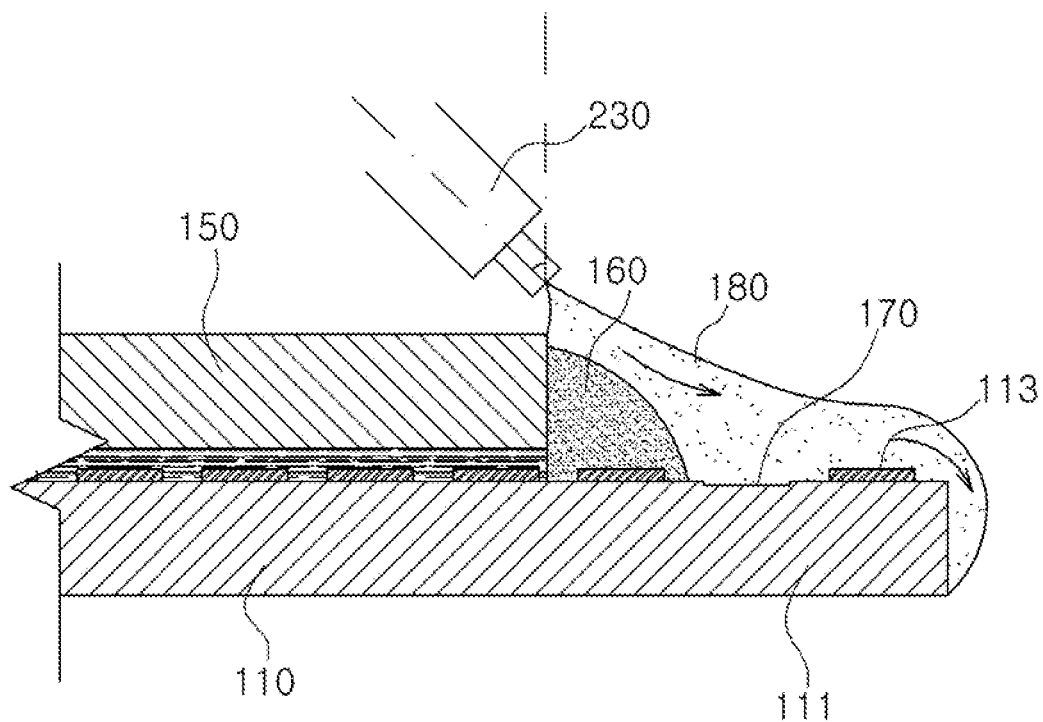

[FIG.8]
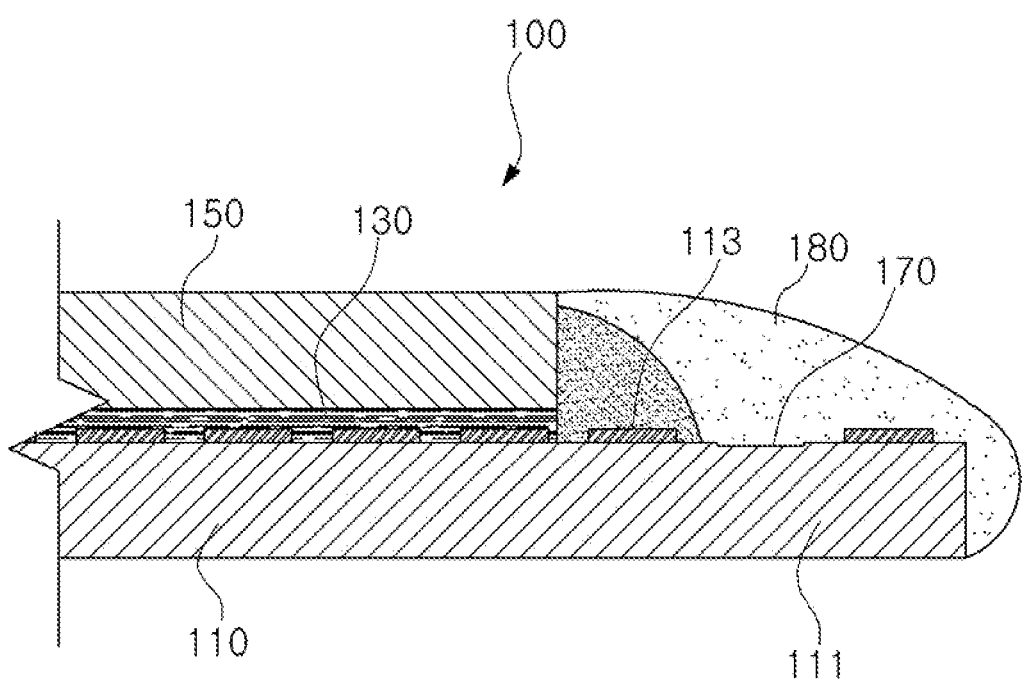

STRETCHED DISPLAY PANEL AND METHOD FOR MANUFACTURING SAME

TECHNICAL FIELD

The present invention relates to a stretched display panel manufactured by cutting a ready-made display panel for displaying an image and a method of manufacturing the same.

BACKGROUND ART

In general, a display panel, which is a device for displaying an image, includes a thin film transistor (TFT) substrate, a color filter substrate, and a liquid crystal layer disposed therebetween.

In the display panel configured as described above, the polymer liquid crystal layer blocks or transmits light emitted from the TFT substrate, and the light is colored through the color filter substrate, whereby an image is displayed.

Meanwhile, display panels are manufactured in standardized sizes. In the case in which a non-standardized display panel is to be used, therefore, a standardized display panel is cut.

A conventional method of cutting a display panel is disclosed in Korean Registered Patent No. 10-0671215 (published on Jan. 18, 2007) entitled FLAT DISPLAY PANEL AND METHOD OF CUTTING THE SAME.

In the conventional flat display panel and the conventional method of cutting the flat display panel, the flat display panel includes two fragile material substrates bonded to each other using a seal excluding openings, the two fragile material substrates and the seal defining a closed space, one of the two fragile material substrates has a scribed surface, which constitutes the outer surface of the closed space, the scribed surface of one of the fragile material substrates is opposite a non-scribed surface of the other fragile material substrate, a terminal unit is located at the scribed surface of one of the fragile material substrates, and the scribed surface of one of the fragile material substrates is cut first.

In the conventional flat display panel described above, the lower fragile material substrate is cut with a margin in the direction in which the lower fragile material substrate is bent, whereby the upper and lower fragile material substrates can be cut so as to have the same length.

When the conventional flat display panel is cut, however, conductive foreign matter separated from circuits printed on the fragile material substrates may be attached to a circuit substrate, whereby noise may be generated due to short circuit, and therefore the defect rate of the flat display panel may be high.

In addition, it is difficult to restore display panels in which a noise defect occurs, and all such display panels must therefore be discarded.

In addition, the cut portion of the display panel is hermetically sealed using a seal; however, when the seal is applied, a spray nozzle applies the seal in the vertical direction or in the horizontal direction, whereby foreign matter may flow into a gap between the fragile material substrates or may be fixed to the fragile material substrates, and therefore a noise defect may occur.

DISCLOSURE

Technical Problem

The present invention has been made in view of the above problems, and it is an object of the present invention to provide a stretched display panel configured such that the amount of noise generated in the stretched display panel due to conductive foreign matter is minimized when a display panel is cut in order to manufacture the stretched display panel, whereby the defect rate of the stretched display panel is reduced, such that an existing display panel in which a noise defect occurs is capable of being restored, whereby the number of stretched display panels that are discarded is minimized, and such that foreign matter is removed when a reinforcement seal is installed, whereby the defect rate of the stretched display panel is minimized, and a method of manufacturing the same.

Technical Solution

In accordance with an aspect of the present invention, the above and other objects can be accomplished by the provision of a method of manufacturing a stretched display panel by cutting a ready-made display panel including a color filter substrate and a thin film transistor (TFT) substrate to a desired size, the method including cutting the TFT substrate to a desired size, cutting the color filter substrate so as to have a length smaller than the length of the TFT substrate such that a pixel exposure portion, from which one or more horizontal pixel lines are exposed, is formed at the TFT substrate, forming an open-circuit line for open-circuiting a portion defined between a horizontal pixel line that is located at the end of the TFT substrate and another horizontal pixel line adjacent thereto in order to prevent electrical noise due to the horizontal pixel lines being introduced into the end of the TFT substrate exposed from the pixel exposure portion, and forming a reinforcement seal for covering the pixel exposure portion using a reinforcement material in order to prevent occurrence of short circuit due to introduction of foreign matter into a gap defined between the horizontal pixel line and the other horizontal pixel line and at the same time to increase rigidity of the pixel exposure portion, wherein the step of forming the reinforcement seal includes applying the reinforcement material through an application nozzle for applying the reinforcement material, the application nozzle being disposed at the end of the color filter substrate so as to be inclined toward the end of the TFT substrate in order to spray the reinforcement material, such that foreign matter on the pixel exposure portion is pushed by the reinforcement material that is applied and is thus removed.

The method may further include applying a sealing material for preventing foreign matter from flowing into a gap defined between the color filter substrate and the TFT substrate when the open-circuit line is formed in order to form a hermetically sealing seal, wherein the step of forming the hermetically sealing seal may be performed between the step of cutting the color filter substrate so as to have the smaller length and the step of forming the open-circuit line.

The method may further include spraying carbon dioxide in order to wash the display panel, wherein the step of spraying the carbon dioxide may be performed between the step of forming the open-circuit line and the step of forming the reinforcement seal.

The step of spraying carbon dioxide in order to wash the display panel may include washing the display panel through a spray nozzle for applying the carbon dioxide, the spray nozzle being disposed at the end of the color filter substrate so as to be inclined toward the end of the TFT substrate.

In accordance with another aspect of the present invention, there is provided a stretched display panel manufactured using the method of manufacturing the stretched display panel.

Advantageous Effects

According to the present invention, it is possible to manufacture a stretched display panel in which the amount of noise that is generated due to conductive foreign matter is minimized by cutting a TFT substrate first, cutting a color filter substrate such that a pixel exposure portion is formed at the TFT substrate, installing a reinforcement seal at the TFT substrate, and forming an open-circuit line at the TFT substrate at the time of cutting a display panel.

In addition, an existing display panel in which a noise defect occurs may be restored using the same method, whereby it is possible to minimize the number of defective stretched display panels that are discarded.

In addition, a reinforcement material is applied toward the end of the TFT substrate in order to form a reinforcement seal, whereby it is possible to remove foreign matter from the pixel exposure portion. At the same time, the reinforcement seal is formed so as to extend to the side surface of the end of the TFT substrate, whereby it is possible to prevent inflow of foreign matter.

In addition, washing is performed using carbon dioxide, whereby it is possible to easily remove micro-scale conductive foreign matter.

DESCRIPTION OF DRAWINGS

FIG. 1 is a plan view showing a stretched display panel according to an embodiment of the present invention.

FIG. 2 is a perspective view illustrating a method of manufacturing a stretched display panel according to an embodiment of the present invention, showing the state in which a TFT substrate is cut.

FIG. 3 is a perspective view illustrating the method of manufacturing the stretched display panel according to the embodiment of the present invention, showing the state in which a color filter substrate is cut.

FIG. 4 is a perspective view illustrating the method of manufacturing the stretched display panel according to the embodiment of the present invention, showing the state in which a hermetically sealing seal is formed.

FIG. 5 is a perspective view illustrating the method of manufacturing the stretched display panel according to the embodiment of the present invention, showing the state in which an open-circuit line is formed.

FIG. 6 is a side sectional view illustrating the method of manufacturing the stretched display panel according to the embodiment of the present invention, showing the state in which the stretched display panel is washed through a spray nozzle.

FIG. 7 is a side sectional view illustrating the method of manufacturing the stretched display panel according to the embodiment of the present invention, showing the state in which a reinforcement material is applied through an application nozzle.

FIG. 8 is a partial side sectional view showing a stretched display panel manufactured using the method of manufacturing the stretched display panel according to the embodiment of the present invention.

DESCRIPTION OF REFERENCE NUMERALS

100: Stretched display panel
110: TFT substrate
111: Pixel exposure portion
113: Horizontal pixel lines
130: Polymer liquid crystal layer
150: Color filter substrate
160: Hermetically sealing seal
170: Open-circuit line
180: Reinforcement seal
190: Drive circuit substrate
200: Ready-made display panel
210: Spray nozzle
230: Application nozzle

BEST MODE

Hereinafter, embodiments of the present invention will be described with reference to the accompanying drawings.

A stretched display panel 100 according to the present invention may be a display panel that is manufactured by cutting a ready-made display panel 200 into a desired shape, or may be a stretched display panel that is manufactured in advance and is defective.

As shown in FIG. 1, the portion of a ready-made display panel 200 that is opposite the portion of the ready-made display panel to which a drive circuit is attached is cut in the horizontal direction such that only the portion of the ready-made display panel to which a tab of a drive circuit substrate 190 is attached is used as a stretched display panel 100, and the remaining portion of the ready-made display panel is discarded without being used.

The stretched display panel 100, which is manufactured by cutting the ready-made display panel in the horizontal direction, as described above, has an aspect ratio of, for example, 2 or more:1, rather than a general aspect ratio of 16:9, 16:10, or 4:3. For this reason, the display panel manufactured as described above is called a stretched display panel 100.

Here, the display panel 200, from which the stretched display panel 100 is manufactured, may be a liquid crystal display (LCD).

First, a method of manufacturing a stretched display panel 100 according to an embodiment of the present invention will be described.

As shown in FIG. 2, the stretched display panel 100 according to the embodiment of the present invention is manufactured by cutting only a thin film transistor (TFT) substrate 110 of a ready-made display panel 200 to a desired size first.

At this time, the TFT substrate 110 may be cut using any cutting means, such as a diamond wheel, a laser, a water jet, or chemical etching.

When the TFT substrate 110 is cut, pixels or gate lines in the cut portion of the TFT substrate are damaged by the cutting means. In this embodiment, therefore, the TFT substrate 110 is cut with a margin equivalent to about three horizontal pixel lines 113 in consideration of the pixels that are damaged. Alternatively, one or more horizontal pixel lines 113 may be left.

Each of the horizontal pixel lines 113 is a line in which electrical pixels are arranged horizontally on the TFT substrate 110, and gate lines for electrically connecting the horizontal pixel lines may be included.

As shown in FIG. 3, the display panel 200 is turned upside down after the TFT substrate 110 is cut, and then a color filter substrate 150 is cut.

Meanwhile, the color filter substrate 150 is cut so as to have a length smaller than the length of the TFT substrate 110 such that a pixel exposure portion 111, from which a plurality of horizontal pixel lines 113 is exposed, is formed at the TFT substrate 110.

In the same manner as when cutting the TFT substrate 110, the color filter substrate 150 may be cut using any of cutting means, such as a diamond wheel, a laser, or chemical etching.

At least two horizontal pixel lines 113, which are left in consideration of the pixels that are damaged when the TFT substrate 110 is cut, may be exposed from the TFT substrate 110.

Meanwhile, the pixel exposure portion 111 of the TFT substrate 110, from which the horizontal pixel lines 113 are exposed, may function to support the lower end of a hermetically sealing seal 160, which will be described below, in order to form the hermetically sealing seal 160.

In the case in which the color filter substrate 150 and the TFT substrate 110 are cut so as to have the same length, a gel-type sealing material runs down when the hermetically sealing seal 160 is installed between the color filter substrate 150 and the TFT substrate 110, whereby it is difficult to form the hermetically sealing seal 160.

In addition, it is necessary to use a gel-type hermetically sealing seal 160 having high viscosity in order to easily fix the gel-type hermetically sealing seal 160, whereby the thickness of the hermetically sealing seal 160 may be increased, and the amount of material that is used to form the hermetically sealing seal 160 may be increased.

After the color filter substrate 150 is cut, the portion of a polymer liquid crystal layer 130 that is located above the pixel exposure portion 111 may be removed.

As shown in FIG. 4, after both the color filter substrate 150 and the TFT substrate 110 are cut, the hermetically sealing seal 160 may be formed in order to prevent foreign matter from flowing into a gap between the color filter substrate 150 and the TFT substrate 110, and at the same time to protect the polymer liquid crystal layer 130, which is located between the color filter substrate 150 and the TFT substrate 110, from being discharged therefrom.

Meanwhile, the portion at which the hermetically sealing seal 160 will be formed may be washed in order to remove foreign matter therefrom, and then the hermetically sealing seal 160 may be formed by applying a sealing material to the circumference of the end of the color filter substrate 150.

At this time, the hermetically sealing seal 160 may be installed such that at least one horizontal pixel line 113 that is adjacent to the end of the color filter substrate 150 is also hermetically sealed.

Here, the hermetically sealing seal 160 may perform both a function of preventing outflow of the polymer liquid crystal layer 130 and a function of preventing foreign matter from flowing into horizontal pixel lines 113 that are not damaged.

The hermetically sealing seal 160 may be formed by applying a hardenable resin in order to prevent the color filter substrate and the TFT substrate 110 from being damaged by heat and then performing hardening treatment on the hardenable resin such that the hardenable resin is hardened.

Here, the hardening treatment may be performed differently depending on kind of the hardenable resin. For example, a natural hardenable resin may be left at a normal temperature for a predetermined amount of time, a thermosetting resin may be thermally treated, and ultraviolet light may be applied to an ultraviolet (UV)-curable resin.

As shown in FIG. 5, after the hermetically sealing seal 160 is installed at the end of the color filter substrate 150, an open-circuit line 170 is formed in order to electrically open the horizontal pixel lines 113 that are exposed from the pixel exposure portion 111 such that noise is prevented from being generated by possible conductive foreign matter.

Meanwhile, the open-circuit line 170 may be formed between a horizontal pixel line 113 that is located at the end of the TFT substrate 110 and another horizontal pixel line 113 adjacent thereto, or may be formed between a horizontal pixel line 113 that is covered by the hermetically sealing seal 160 and an adjacent horizontal pixel line 113 that is not covered by the hermetically sealing seal 160.

In addition, the open-circuit line 170 may be formed on a horizontal pixel line 113 that is located between horizontal pixel lines 113, or may be formed on a conductor for electrically connecting the horizontal pixel lines 113 to each other. Alternatively, the open-circuit line 170 may be formed by applying a laser to the electrical connection portion in order to remove the electrical connection portion through incineration.

In the case in which the open-circuit line 170 is formed through incineration using the laser, it is possible to minimize the amount of conductive foreign matter that is separated from the horizontal pixel lines 113, whereby it is possible to prevent generation of noise due to short circuit.

In addition, the horizontal pixel line 113 that is located at the end of the TFT substrate 110 as the result of being cut by the open-circuit line 170 may perform a function of extinguishing overcurrent/overvoltage generated due to static electricity, etc. and thus inhibiting generation of noise.

Meanwhile, after the open-circuit line 170 is formed on the horizontal pixel line 113, a preliminary inspection may be carried out.

The preliminary inspection is carried out as follows. The drive circuit is powered on in order to temporarily drive the stretched display panel 100, and then inspection is performed in order to determine whether noise is generated in the stretched display panel 100.

When the color filter substrate 150 or the TFT substrate 110 is cut, foreign matter is generated therefrom. In particular, conductive foreign matter is generated from the TFT substrate 110 due to the characteristics thereof. The generated conductive foreign matter flows into the exposed pixels, whereby a short circuit occurs. When the short-circuited display panel 200 is driven, noise is generated, whereby a horizontally striped pattern image is not displayed.

As shown in FIG. 6, in the case in which noise is generated when the preliminary inspection is carried out, the portion of the display panel in which the noise is generated may be inspected intensively in order to remove foreign matter, or the pixel exposure portion 111, from which the horizontal pixel lines 113 are exposed, may be entirely washed in order to remove foreign matter.

Of course, the pixel exposure portion 111 may be entirely washed in order to form a reinforcement seal 180 in the next process even in the case in which no preliminary inspection is carried out.

Meanwhile, carbon dioxide ($CO_2$) may be sprayed onto the pixel exposure portion 111 in order to wash the pixel exposure portion 111.

Here, carbon dioxide has low surface tension, whereby the carbon dioxide may easily permeate into a microporous structure. In addition, carbon dioxide has a higher diffusion coefficient than liquid and has similar solubility to liquid, whereby the washing effect of the carbon dioxide is high, and therefore it is possible to easily remove micro-scale conductive material.

A spray nozzle 210, which is configured to spray carbon dioxide, may be installed so as to be inclined at a predetermined angle in order to spray the carbon dioxide toward the end of the TFT substrate 110, which extends from the end of the color filter substrate 150.

In the case in which carbon dioxide is sprayed through the spray nozzle 210 in the state in which the spray nozzle is installed so as to be inclined, as described above, the carbon dioxide may be naturally discharged to the end of the TFT substrate 110 together with foreign matter without colliding with any obstacle, whereby it is possible to completely remove the foreign matter. In addition, it is possible to remove the conductors remaining at the end of the TFT substrate 110 when the TFT substrate 110 is cut together with the foreign matter by cutting the conductors using the pressure of the carbon dioxide that is sprayed (see FIG. 5).

As shown in FIG. 7, after the pixel exposure portion 111 is washed, a reinforcement seal 180 may be installed at the pixel exposure portion 111 in order to prevent foreign matter from flowing into the pixel exposure portion 111 and at the same time to increase the rigidity of the pixel exposure portion 111, the thickness of which is relatively small.

The reinforcement seal 180 may be formed so as to entirely cover the pixel exposure portion 111 from the end of the color filter substrate 150 to the end of the TFT substrate 110 in order to reinforce the pixel exposure portion 111.

A reinforcement material may be realized by the same hardenable resin as the sealing material. The hardenable resin may be applied to the portion at which the reinforcement seal 180 will be formed, and hardening treatment may be performed on the hardenable resin such that the hardenable resin is hardened in order to form the reinforcement seal 180. The reinforcement seal 180 may be installed so as to also cover the hermetically sealing seal 160.

Meanwhile, the hardenable resin, which is realized as the reinforcement material, may be a naturally hardenable resin or a thermosetting resin.

However, a UV-curable resin, which is hardened by ultraviolet light, may be used as the hardenable resin in order to minimize damage to the pixels due to heat. The reinforcement material may be a material having higher hardness than the sealing material after being hardened.

The reinforcement material may be applied through an application nozzle 230 in order to form the reinforcement seal 180, whereby the reinforcement seal is installed. The application nozzle 230 may be installed so as to be inclined at a predetermined angle in order to spray the reinforcement material toward the end of the TFT substrate 110, which extends from the end of the color filter substrate 150.

In the case in which the reinforcement material is applied through the application nozzle 230 in the state in which the spray nozzle is installed so as to be inclined, as described above, the reinforcement material may move from the end of the color filter substrate 150 toward the end of the TFT substrate. At this time, foreign matter remaining on the pixel exposure portion may be discharged to the end of the TFT substrate, whereby the foreign matter may be removed when the reinforcement seal is installed.

In addition, when the reinforcement material is discharged from the TFT substrate 110, the reinforcement material may flow downwards from the end of the TFT substrate 110, whereby the end of the TFT substrate 110 may be covered by the reinforcement seal 180, and therefore it is possible to prevent foreign matter from flowing into a gap between the reinforcement seal 180 and the TFT substrate 110.

Meanwhile, after the reinforcement seal 180 is formed on the pixel exposure portion 111, a final inspection is carried out.

The final inspection is carried out in the same manner as the preliminary inspection. That is, the stretched display panel 100 is powered on in order to drive the stretched display panel 100, and then noise is detected in the stretched display panel 100.

Here, the final inspection may be accurately performed based on an image of the display panel 100 captured using a camera, or may be performed by the naked eye.

In the case in which noise is generated during the final inspection, the hermetically sealing seal 160 and the reinforcement seal 180 may be removed, and then foreign matter may be removed or washed. Alternatively, the open-circuit line 170 may be formed again, the hermetically sealing seal 160 and the reinforcement seal 180 may be formed again, and the inspection may be carried out again.

After passing the final inspection, the manufacture of the stretched display panel 100 according to the embodiment of the present invention is completed. The manufactured stretched display panel 100 may be delivered as is, or may be installed at a place at which the stretched display panel 100 is to be installed in order to use the stretched display panel 100.

In addition, the method of manufacturing the stretched display panel 100 according to the embodiment of the present invention may also be used in order to restore an existing stretched display panel 100 that is classified as a defective panel due to noise generated therein.

Meanwhile, as shown in FIG. 8, a stretched display panel 100, manufactured using the method of manufacturing the stretched display panel 100 according to the embodiment of the present invention, is configured to have a structure in which a TFT substrate 110 protrudes further than a color filter substrate 150 such that horizontal pixel lines 113 are exposed and in which a hermetically sealing seal 160 for preventing outflow of a polymer liquid crystal layer is installed at the end of a color filter substrate 150.

In addition, the stretched display panel is configured to have a structure in which an open-circuit line 170 is formed between a horizontal pixel line 113 that is located at the end of the TFT substrate 110 and another horizontal pixel line 113 adjacent thereto in order to form an electrical open circuit therebetween and in which a reinforcement seal 180 is finally installed in order to entirely cover a pixel exposure portion 111.

In the stretched display panel 100, manufactured using the method of manufacturing the stretched display panel 100 according to the embodiment of the present invention, it is possible to minimize the amount of noise that is generated in the stretched display panel due to foreign matter, whereby it is possible to considerably reduce the defect rate of the stretched display panel 100.

In addition, it is possible to restore an existing stretched display panel 100 that is determined to be a defective panel due to noise generated therein, whereby it is possible to minimize financial loss due to discarding the same.

In addition, the reinforcement material is applied toward the end of the TFT substrate 110 in order to form the reinforcement seal 180, whereby it is possible to remove foreign matter using the reinforcement material that is applied. At the same time, the reinforcement seal 180 is formed so as to extend to the end of the TFT substrate 110, whereby it is possible to prevent generation of noise due to introduction of foreign matter into a gap between the reinforcement seal 180 and the TFT substrate 110.

In addition, carbon dioxide is sprayed at the time of washing the pixel exposure portion 111, whereby it is possible to easily remove foreign matter using the carbon dioxide. The carbon dioxide is sprayed toward the end of the TFT substrate 110 in order to wash the TFT substrate 110, whereby it is possible to remove the conductors remaining at the end of the TFT substrate 110 by cutting the conductors using the carbon dioxide that is sprayed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a stretched display panel by cutting a ready-made display panel comprising a color filter substrate and a thin film transistor (TFT) substrate to a desired size, the method comprising:
   cutting the TFT substrate to a desired size;
   cutting the color filter substrate so as to have a length smaller than a length of the TFT substrate such that a pixel exposure portion, from which one or more horizontal pixel lines are exposed, is formed at the TFT substrate;
   forming an open-circuit line for open-circuiting a portion defined between a horizontal pixel line that is located at an end of the TFT substrate and another horizontal pixel line adjacent thereto in order to prevent electrical noise due to the horizontal pixel lines being introduced into the end of the TFT substrate exposed from the pixel exposure portion; and
   forming a reinforcement seal for covering the pixel exposure portion using a reinforcement material in order to prevent occurrence of short circuit due to introduction of foreign matter into a gap defined between the horizontal pixel line and the other horizontal pixel line and at the same time to increase rigidity of the pixel exposure portion, wherein
   the step of forming the reinforcement seal comprises applying the reinforcement material through an application nozzle for applying the reinforcement material, the application nozzle being disposed at an end of the color filter substrate so as to be inclined toward the end of the TFT substrate in order to spray the reinforcement material, such that foreign matter on the pixel exposure portion is pushed by the reinforcement material that is applied and is thus removed.

2. The method according to claim 1, further comprising:
   applying a sealing material for preventing foreign matter from flowing into a gap defined between the color filter substrate and the TFT substrate when the open-circuit line is formed in order to form a hermetically sealing seal, wherein
   the step of forming the hermetically sealing seal is performed between the step of cutting the color filter substrate so as to have the smaller length and the step of forming the open-circuit line.

3. The method according to claim 1, further comprising:
   spraying carbon dioxide in order to wash the display panel, wherein
   the step of spraying the carbon dioxide is performed between the step of forming the open-circuit line and the step of forming the reinforcement seal.

4. The method according to claim 3, wherein the step of spraying carbon dioxide in order to wash the display panel comprises washing the display panel through a spray nozzle for applying the carbon dioxide, the spray nozzle being disposed at the end of the color filter substrate so as to be inclined toward the end of the TFT substrate.

5. A stretched display panel manufactured using the method of manufacturing the stretched display panel according to claim 1.

* * * * *